United States Patent
Bjegovic et al.

(10) Patent No.: US 10,162,776 B2
(45) Date of Patent: Dec. 25, 2018

(54) NEGOTIATION BETWEEN MULTIPLE PROCESSING UNITS FOR SWITCH MITIGATION

(71) Applicant: Apple Inc., Cupertino, CA (US)

(72) Inventors: Nebojsa Bjegovic, Santa Clara, CA (US); Vanessa Cristina Heppolette, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 210 days.

(21) Appl. No.: 15/196,642

(22) Filed: Jun. 29, 2016

(65) Prior Publication Data

US 2016/0306760 A1 Oct. 20, 2016

Related U.S. Application Data

(60) Division of application No. 13/720,131, filed on Dec. 19, 2012, now Pat. No. 9,405,716, which is a continuation of application No. 12/239,618, filed on Sep. 26, 2008, now Pat. No. 8,356,200.

(51) Int. Cl.
- *G06F 13/362* (2006.01)
- *G09G 5/00* (2006.01)
- *G06F 13/40* (2006.01)

(52) U.S. Cl.
CPC ........ *G06F 13/362* (2013.01); *G06F 13/4022* (2013.01); *G06F 13/4068* (2013.01); *G09G 5/006* (2013.01); *G09G 2370/047* (2013.01)

(58) Field of Classification Search
CPC ............... G06F 13/362; G06F 13/4022; G06F 13/4068; G09G 5/006
See application file for complete search history.

(56) References Cited

U.S. PATENT DOCUMENTS

| | | | |
|---|---|---|---|
| 4,102,491 A | 7/1978 | Devito et al. | |
| 4,821,170 A * | 4/1989 | Bernick | G06F 13/122 710/36 |
| 5,941,968 A * | 8/1999 | Mergard | G06F 13/4022 710/308 |
| 6,724,224 B1 | 4/2004 | Li | |
| 6,738,856 B1 * | 5/2004 | Milley | G01J 3/0264 307/31 |
| 7,039,734 B2 | 5/2006 | Sun et al. | |
| 7,039,737 B1 * | 5/2006 | Dorr | G06F 9/526 710/240 |
| 7,849,246 B2 | 12/2010 | Konishi et al. | |
| 7,882,282 B2 | 2/2011 | Haban et al. | |
| 2004/0059852 A1* | 3/2004 | Sun | G06F 13/4291 710/110 |
| 2006/0271717 A1* | 11/2006 | Koduri | G06F 9/52 710/241 |
| 2007/0061536 A1 | 3/2007 | Ivanov | |
| 2011/0158021 A1 | 6/2011 | Wiatrowski | |

* cited by examiner

*Primary Examiner* — Nimesh G Patel
(74) *Attorney, Agent, or Firm* — Meyertons, Hood, Kivlin, Kowert & Goetzel, P.C.

(57) ABSTRACT

A method for maintaining data and clock line synchronization, which may include a clock line that may be driven high after a clock line falling edge to mitigate a clock error. Additionally, the clock error may be mitigated by maintaining a saturated state of a device. Furthermore, a register may be connected to a microcontroller and/or a graphical processing unit to negotiate control of a switch and a bus.

14 Claims, 7 Drawing Sheets

NEGOTIATION BETWEEN MULTIPLE PROCESSING UNITS FOR SWITCH MITIGATION

This application is a divisional of U.S. patent application Ser. No. 13/720,131, filed on Dec. 19, 2012, which is a continuation of U.S. patent application Ser. No. 12/239,618, filed on Sep. 26, 2008, now U.S. Pat. No. 8,356,200, issued Jan. 15, 2013. The prior patent applications are hereby incorporated by reference in their entirety as though fully and completely set forth herein.

FIELD OF THE INVENTION

The present invention generally relates to multiple processing units that may access the same data devices, and more specifically to negotiating ownership between multiple processing units for control of a bus and a switch within the I²C bus protocol.

BACKGROUND

Modern electronic systems have become increasingly interconnected. As one of many examples, audiovisual content, such as movies, television shows and music, are commonly delivered across various networks to an end user's home for viewing. To continue the example, a user may receive such content from a satellite transmission, cable connection, broadband Internet connection and so on. Although each such transmission network provides many options for content, users accessing the Internet may have nearly unlimited options for downloading, streaming and/or purchasing audiovisual content.

One issue faced by content providers is the ability to keep their content relatively secure and free from unauthorized copying. To address this issue, a variety of content control protocols have been implemented. One example of such a protocol is the high bandwidth digital content protection (HDCP) standard. HDCP-compliant devices typically implement some form of digital rights management (DRM) and are connected to a compatible digital audio device and/or video display device. Exemplary HDCP devices include set-top boxes, digital video disc players, Blu-Ray disc players, personal computers, video game consoles, audiovisual receivers, devices specifically configured to stream audiovisual content from the Internet or another source, and so forth.

Some HDCP interfaces include a signal which may be enabled or disabled through electronic circuitry, including processing units that may access data from common sources. One example of an electronic device employing an HDCP interface with the exemplary security signal is the Apple TV™ product, produced and sold by Apple Inc. of Cupertino, Calif.

Signal data may be synchronized using clock signals, buses, switches such as transistors, bus protocols such as the I²C protocol and so forth. While data typically may be passed between the processing units and video devices, under certain circumstances an error may occur in a clock signal, thus causing the data to become desynchronized. Such errors may cause the data to cease transmission and interrupt the user's enjoyment of a selected program.

Accordingly, there is a need in the art for an improved method of suppressing or preventing the generation of such errors.

SUMMARY

One embodiment of the present invention takes the form of a method for changing a state of a display data channel ("DDC") clock output. A counting cycle of a counter may be initiated at a predetermined event based on the clock output and an initial value of the DDC clock output may be maintained while the counter executes the counting cycle. Additionally, the DDC clock output may be set to a first value approximately when the counting cycle of the counter reaches a preset value. The first value of the DDC clock output also may be set to a value equivalent to zero. Also, a device may be saturated when the counter reaches a preset value and in one embodiment, the device may be a field effect transistor.

In another embodiment, the present invention may take the form of a method for controlling the state of a switch. A graphical processing unit may receive a request for a bus in an electronics system. The electronics system may be a video system which may employ any number of protocols, including, but not limited to a high definition multimedia interface, a digital video interface, a display port interface and so on. The graphical processing unit may grant the request when a microcontroller completes a transaction on the bus. Additionally, the graphical processing unit may request the switch and the microcontroller may grant the switch to the graphical processing unit. The state of the switch may be modified by applying a value sufficient to close the switch.

In yet another embodiment, the present invention may take the form of an apparatus for mitigating a clock error. The apparatus may include at least a DDC bus, a graphical processing unit which may be connected to the bus, a microcontroller which may be connected to the bus and a switch which may be connected to the graphical processing unit and the microcontroller. Additionally, the apparatus may include a first output which may be controlled by at least one of the graphical processing unit and microcontroller and connected to the switch and a register which may be connected to the graphical processing unit and microcontroller, and storing at least sufficient data to establish ownership of the bus and negotiate a change in ownership of the bus. The bus may employ the I²C protocol. Further, the register may include bits configured to signal the graphical processing unit and microcontroller to at least grant ownership of the bus. The first bit of the register may be configured to signal the graphical processing unit to request the DDC bus when set equal to one. The second bit of the register may be configured to signal the microcontroller to grant the DDC bus. The third bit may be configured to signal the graphical processing unit to request the switch and the fourth bit may be configured to signal the microcontroller to grant the switch. Moreover, the register may be located in the microcontroller.

DETAILED DESCRIPTION OF EMBODIMENTS

Figure 1A:
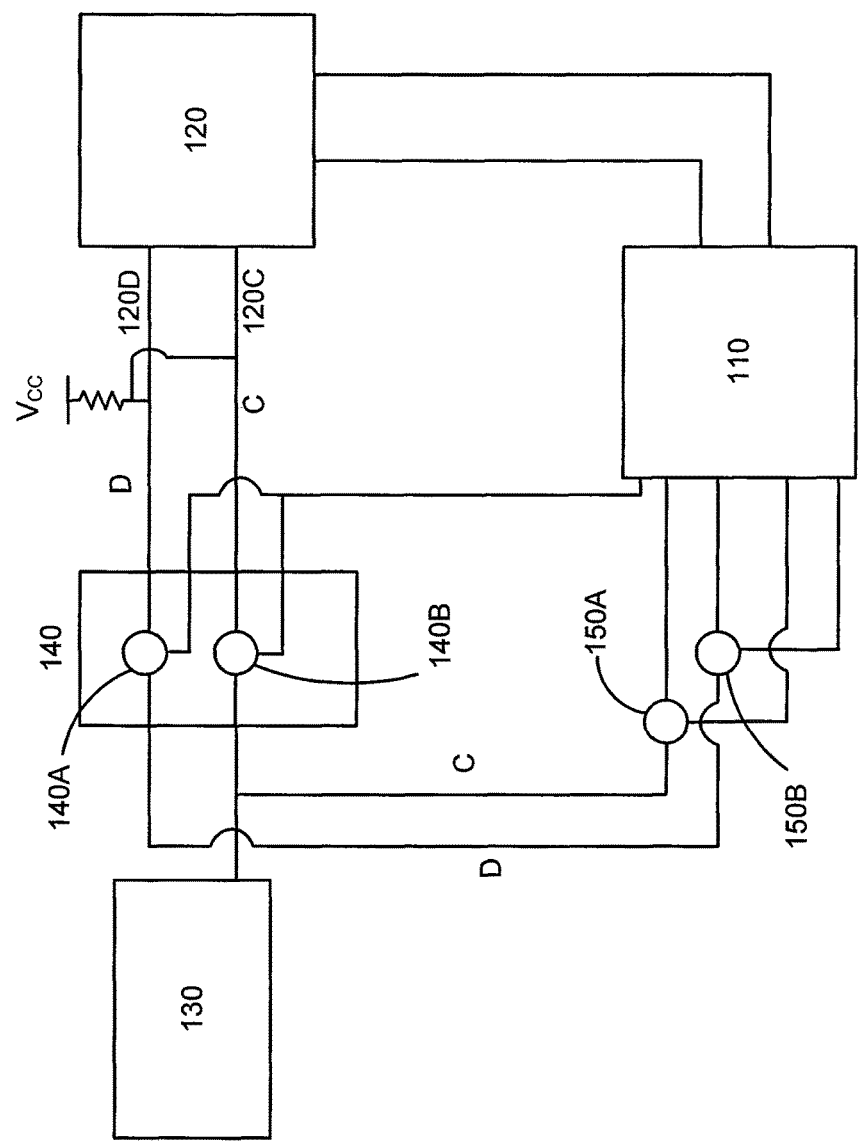
FIG. 1A is a schematic diagram generally depicting an embodiment.

Generally, one embodiment of the present invention may take the form of a method for suppressing an error in a clock line by driving the clock line high after the clock line falls low simultaneously as or, but before the error occurs. For example, the microcontroller may anticipate that an error may occur in the clock line at some point after the falling edge of the clock signal. An error may be a false, partial high pulse that may be an unintended signal in the clock line. The error may be detected as an intended clock signal even though it may occur unintentionally. The microcontroller may drive the clock signal high at a time T1 occurring after the falling edge of the clock line so that the error may be overwritten with an intended high clock signal. The time T1 may be determined by the minimum amount of time between a falling edge and a rising edge as detected by a field effect transistor ("FET").

Another embodiment may take the form of a method for maintaining saturation of FETs to mitigate an error in a clock line. In this embodiment, a counter may start prior to the falling edge of a clock output. When the counter terminates or reaches a second predetermined value, one of two FETs may open to assist in maintaining saturation on the data line. An error in the clock line may be mitigated by maintaining saturation on the data line. Additionally, by opening the FET, the data output may be driven to a low state. The two FETs may be electrically coupled, thus both FETs may maintain saturation. The delay between one of the FETs (where the FET may be a sink device) driving the data line low and the other FET opening on the data line may be approximately 300 nanoseconds.

Yet another embodiment may assist in the negotiation between a graphical processing unit and a microcontroller for control of a bus operating according to the I²C protocol and/or an associated switch. For example, the microcontroller may be connected to a video display device via the bus which may be controlled by the switch, which is typically open when the microcontroller exercises control over the bus. The graphical processing unit may also be connected to the switch. Additionally, the graphical processing unit may be connected to the microcontroller. The graphical processing unit may likewise control the data and clock lines. In order to prevent the microcontroller and graphical processing unit from issuing conflicting commands to the switch and/or bus, a register may be employed. Typically, the register may be located in the microcontroller or an associated memory and negotiate control of the clock and/or data line between the microcontroller and graphical processing unit. By setting certain values in the register, the graphical processing unit and microcontroller may request and pass back and forth control over the lines' outputs, as described in more detail below.

It should be noted that embodiments of the present invention may be used in a variety of systems employing various interfaces, including graphical processing memory or data transaction systems. Certain embodiments may include a variety of data lines, clock lines, switches, counters, memory systems, data systems and microcontrollers. Various embodiments may be used with practically any apparatus related to data systems having input and output lines such as data lines, clock lines and/or counters. Accordingly, embodiments of the present invention may be employed in any type of electronic device with data lines, clock lines, switches, microcontrollers, data systems, memory systems and so on. The embodiments described herein may be implemented, for example to provide error correction for secure content control devices employing current standards or outputs.

FIG. 1A is a schematic depicting a second embodiment of the present invention. FIG. 1A includes a microcontroller 110, a graphical processing unit 120 ("GPU"), a video display device 130, a switch 140, first and second FETs 150a, 150b and clock and data outputs. Additionally, the embodiment of FIG. 1A may use a software register (illustrated in FIG. 1C) in the microcontroller 110 to assist in negotiation between the microcontroller 110 and the GPU 120 for control of the switch and bus. Although the processing unit may be referred to herein as a graphical processing unit, it may be any suitable processor, including a central processing unit.

Figure 1B:
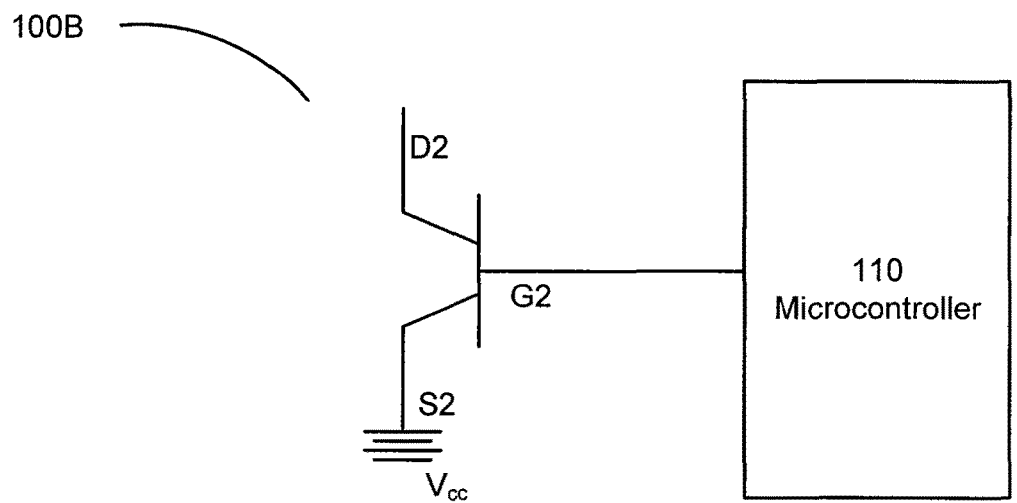
FIG. 1B is a partial schematic diagram depicting first and second options for connecting field-effect transistors in the schematic of FIG. 1A.
Figure 1B:
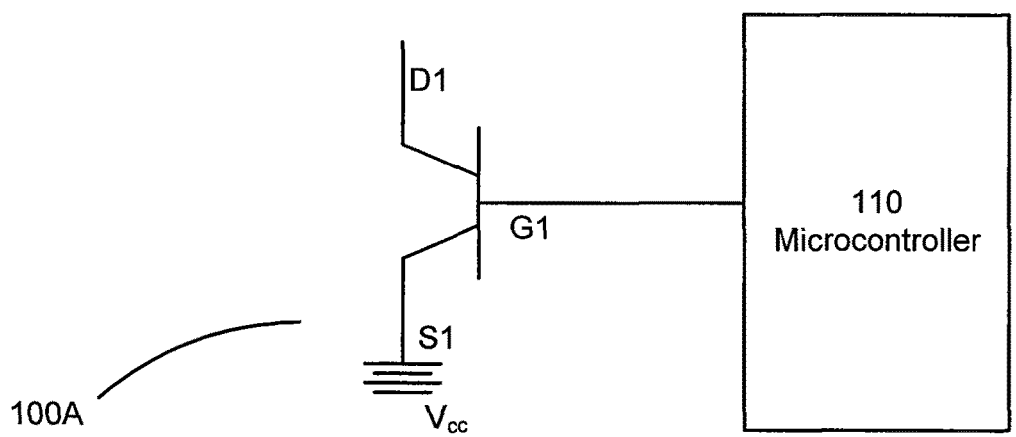

Generally, the FETs and switch presented in FIGS. 1A and 1B may be p-channel FETs, n-channel FETs, bipolar junction transistors or any other appropriate transistor or switch. Also, the figures and related discussion should not be construed as limiting the present embodiment to a particular type of switch or transistor, but merely illustrating one type of transistor that may be used. The microcontroller 110 may be operationally or directly connected to the FETs 150a, 150b. The drain of the FETs 150a, 150b may be connected to the clock line and data line, respectively. The gates of the FETs 150a, 150b are typically connected to an output of the microcontroller 110. The sources of the FETs may be connected either to a voltage source Vcc or the microcontroller, as discussed below in more detail with respect to FIG. 1B.

The graphical processing unit 120 may be directly or operationally connected to the microcontroller 110. Further, the graphical processing unit 120 may be operationally or directly connected to the software register within the microcontroller 110. (The software register is discussed in more detail with respect to FIG. 4C.) The graphical processing unit 120 may also be connected to the switch 140 through a clock output 120c and a data output 120d. Both the clock output 120c and the data output 120d may be maintained at a voltage Vcc by the graphical processing unit, such that the default values of the clock output 120c and the data output 120d are Vcc. Additionally, in one embodiment, the default value of the output 120C may be zero.

The microcontroller 110 and the GPU may be connected to the switch 140. The switch 140 may open and close both the data line and the clock line simultaneously. When the switch 140 is closed, the GPU 120 may have ownership of the bus, the clock line may be driven low by the GPU and the data line 120D may be set to a high impedance condition or tri-stated. Further, when the switch 140 is closed, the data line may be tri-stated on both the microcontroller and the GPU side and the sink device may drive the data as needed. When the switch is closed, the clock line may be released by the microcontroller and the clock line may be driven low by a GPU FET. Additionally, when the switch is open and the clock line is high, the switch may be controlled by the microcontroller and the data line may be driven by the microcontroller. Furthermore, when the switch is open, the microcontroller may open and close the switch to simulate a clock and the microcontroller may read the data line and/or the data may be sampled by the microcontroller.

When the switch 140 is open, the graphical processing unit 120 may not drive the clock line low because the switch is open the graphical processing unit may be cut off from the clock out by an open circuit. Thus, when the switch is open, the clock line is high and when the switch is closed, the microcontroller typically surrenders control and ownership of the clock and data lines to the graphical processing unit. The graphical processing unit 120 may drive the clock line low when the switch is closed without causing the clock line to momentarily drift high because the microcontroller may not detect the clock line falling low when the switch is closed. In alternative embodiments, the microcontroller may not directly alter the output values of the clock and data lines, but instead instruct the GPU to vary these values either through the FETs or by opening and closing the switch accordingly.

In FIG. 1A, the microcontroller 110 and the graphical processing unit 120 may exchange control of the clock and data lines by opening or closing the switch 140. When the switch is open, the microcontroller may control the lines. Likewise, when the switch is closed, the graphical processing unit may control the clock and data lines. The microcontroller 110 may switch the FETs 150*a* and 150*b* to drive the clock and data lines to the video display device 130 when it controls the lines. Thus, while the microcontroller 110 drives the FETs 150*a* and 150*b*, the switch 140 may be open. Although the source and the drain of each FET may be interchanged in certain embodiments, this discussion connects the source and drain of the FETs to specific components and lines. This is done for explanatory purposes only and not for limitation.

Generally, in FIG. 1B, the microcontroller 110 may switch a FET 100*a* or 100*b* as necessary to manipulate the output values of the clock and data lines. It should be noted that FIG. 1B shows only one FET connected to the microcontroller 110 in each exemplary connection. This is because both of the FETs 150*a*, 150*b* shown in FIG. 1A are typically interconnected in the same manner, with their gates and sources identically connected. (The drain of FET 150*a* is connected to the clock line, while the drain of FET 150*b* is connected to the data line.) Accordingly, the exemplary FETs 100*a*, 100*b* may be either the clock FET 150*a* or the data FET 150*b*.

Continuing the discussion of FIG. 1B, the microcontroller 110 may be connected to the source S1 of the FET 100*a*. The microcontroller may hold the gate voltage of the FET 100*a* constant and switch the source voltage to drive the drain voltage, and thus the output of either the clock or data line. Alternatively, and as also shown in FIG. 1B, the FET 100B may have its source connected to a voltage source Vcc. In such an embodiment, the microcontroller 110 may vary the FET's gate voltage to drive the drain voltage and corresponding line output.

Returning to FIG. 1A, the embodiment may permit the microcontroller to control the clock and data lines at certain times and the graphical processing unit to control the lines at other times. Generally, control of the clock and data lines is exclusive; only the microcontroller or the graphical processing unit may control the lines at any given time. The microcontroller and graphical processing unit may negotiate with one another to pass control as necessary. In the present embodiment, a register may be used in the negotiation process. The register in the microcontroller may assist in negotiating ownership of the bus and switch so that the GPU and the microcontroller may both read the same device.

Furthermore, in FIG. 1A, the GPU may effectively maintain a steady state and may drive the clock line low as a default. The microcontroller may intermittently sample data and receive a low clock signal. In this case, the microcontroller may close the switch, tri-state the clock and data lines and then sample the data line. Likewise, in some circumstances the microcontroller may be sending data and expect a response. In such situations, the microcontroller may require a low clock signal to sample the data line. Once the switch is closed, the GPU may drive the clock line low. The low clock signal may pass through the switch; the sink device may detect the low clock signal and may proceed with the transitions on the data line. Once the microcontroller completes its transactions, the microcontroller may open the switch, the clock line may switch to a high state and the microcontroller may sample the data line.

Figure 1C:
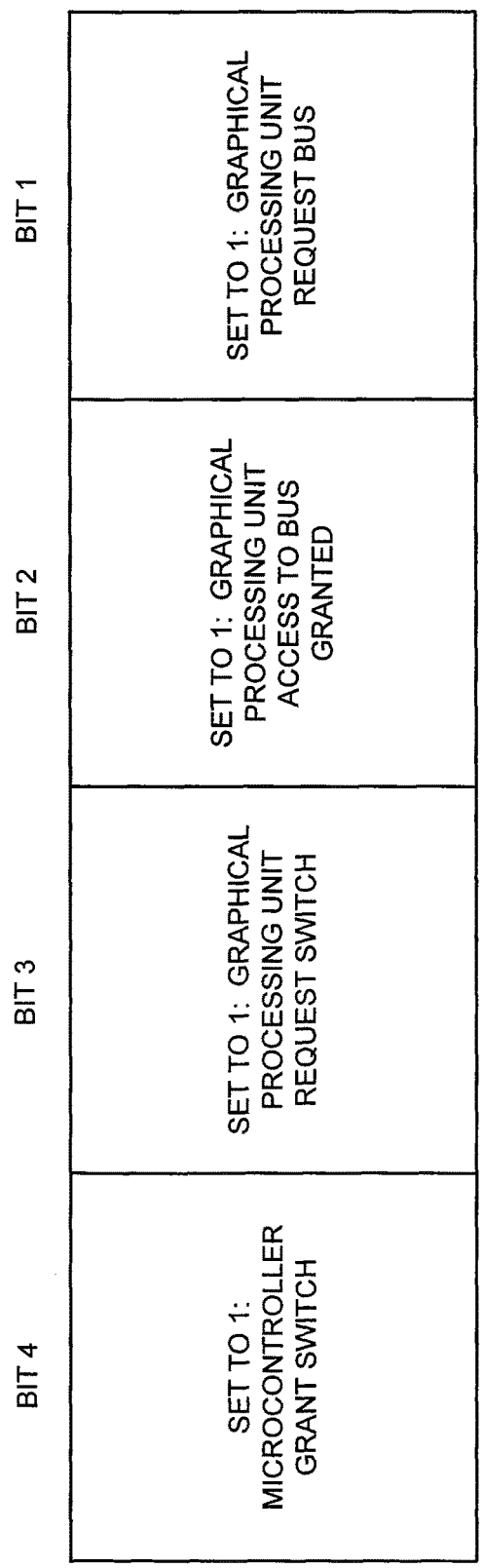
FIG. 1C depicts a multi-bit register employed by an embodiment.

FIG. 1C depicts a four-bit software register 180 that may be resident in a memory of the microcontroller 110 of FIG. 1A, or otherwise accessible by the microcontroller 110. For example, the register 180 may be resident in a separate memory module or the graphical processing unit 120. The four bits of the software register may be set to either one or zero. The software register may have more than four bits in certain embodiments. For example, the register may have eight bits, with some of the bits reserved, used as offsets or not used. Furthermore, the bits in the register may be arbitrarily assigned. Thus, for example, the functionality of bit 1 and bit 2 of FIG. 1C may be switched in another embodiment.

The first bit of the register 180 may indicate whether the GPU 120 is requesting the bus from the microcontroller 110. For example, when the first bit is set to one, the microcontroller 110 is receiving a bus request from the GPU 120. Stated differently, the GPU 120 may write a one to the first bit of the software register in the microcontroller 110 to request the use of the bus from the microcontroller 110. When the first bit is zero, then the GPU 120 has not requested the bus. Although the GPU 120 may write a one to the first bit (thereby informing the microcontroller 110 that it requests grant of the bus), the microcontroller 110 typically finishes using the bus before it grants the bus request. For example, the microcontroller 110 may need to complete its use of the bus before granting the bus request to the graphical processing unit 120 to avoid any potential conflicts on the bus. After the first bit is set to one, the GPU may loop reading the second bit until the second bit is set to one. The microcontroller 110 may write a one to the second bit of the register 180 when the microcontroller 110 is no longer using the bus. When the second bit is one, the microcontroller 110 has granted the bus request of the GPU 120. The third bit generally indicates the GPU 120 has requested the switch 140. When the third bit is set to one, the microcontroller may control the switch 140. The fourth bit of the software register may indicate that the microcontroller 110 has granted the switch 140.

In one embodiment, the GPU may require control of the bus so that the GPU may read data such as extended display identification data ("EDID"). In this embodiment, the GPU may need to hold the bus and the microcontroller may not control the bus. The GPU may release the switch request. Additionally, the GPU may own the switch and the GPU clock may be high. In response, the microcontroller may release the switch (or clear the corresponding bit) and may grant the switch to the GPU. Further, the microcontroller may own the switch. After the microcontroller releases the switch, the GPU may drive the clock line low. The GPU may then notify the microcontroller of the low signal on the clock line and may release the grant request of the bus. The microcontroller may then release the bus grant while it owns the switch and the GPU clock line is still low.

Figure 2:
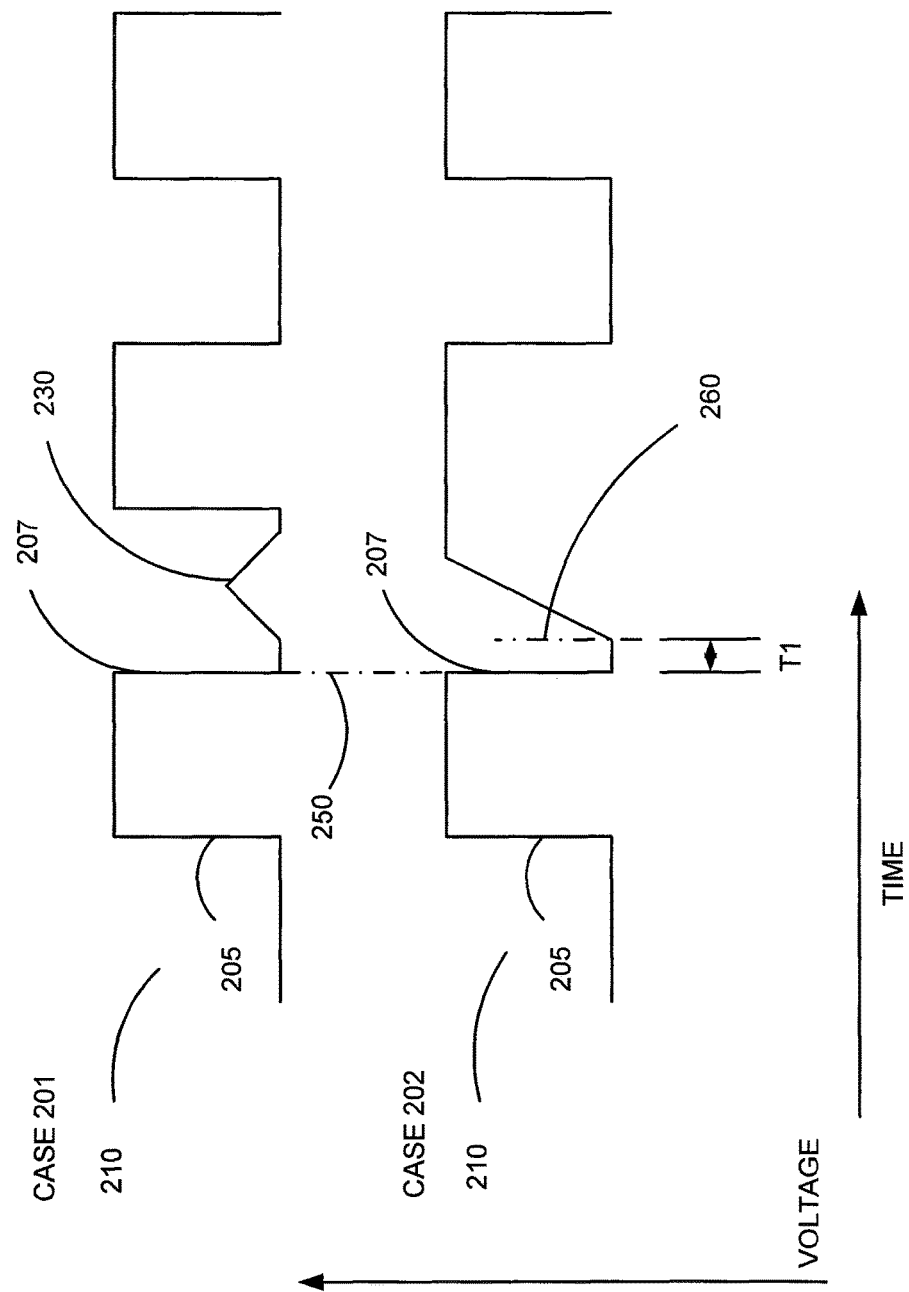
FIG. 2 is a timing diagram showing two cases of an output including a error condition generated in the first case and a solution in the second case.

FIG. 2 is a timing diagram showing two examples of one output. FIG. 2 includes a first case 201 of an output 210, a second case 202 of the output 210, a error 230, a clock rising edge 205 and a clock falling edge 207. The first case 201 of the output 210 may be a clock line with an error. The error in the clock line may be detected by the sink device (e.g., the clock FET 150A of FIG. 1) as an intended clock signal. When the error is detected as an intended clock signal, the error becomes an extra clock signal. The data line may be timed with the clock line, thus the erroneous detection may result in the desynchronization of the data. The second case 202 of the output 210 illustrates an embodiment "covering" the error such that the error will not be erroneously detected by a sink device as a false clock signal.

In the following discussion the first case 201 of the output 210 may be referred to as the "failing state" and the second case 202 of the output 210 may be referred to as the "solution." Such designations are made for explanatory purposes only. Typically, the clock output 210 may vary from zero or substantially zero (e.g., in a low state) to a voltage of Vcc or approximately Vcc (e.g., in a high state). As used herein, "Vcc" is a reference voltage. Different embodiments may employ different voltages for the voltage Vcc.

Generally, the clock output 210 may be at zero, at Vcc or transitioning between zero and Vcc. The clock output 210 may be in a low state when the voltage of the clock line is zero or equivalently zero and may be in a high state when the voltage of the clock line equals Vcc. In the following discussion, the clock output 210 may be referred to as having a zero voltage and/or a voltage of Vcc for purposes of explanation and not of limitation.

Further, in FIG. 2, the clock output 210 may switch between zero and Vcc. For example, the clock output 210 may start at a zero voltage and switch to a voltage of Vcc. The transition of the clock output 210 from zero to Vcc may be referred to herein as a "clock rising edge" 205. The clock output 210 may likewise switch from Vcc to zero, such that the transition defines a "clock falling edge" 207.

As depicted in FIG. 2, in the first case 201, an error 230 may occur at an event 250, as depicted by the dotted line. The event 250 may occur when the clock falling edge 207 of the clock output 210 and the falling edge of a data output align (the data output is not shown in FIG. 2). The error 230 may occur due to a number of factors such as, but not limited to, noise in the electrical signal or a race condition. A race condition may occur in any number of ways, such as when two or more signals may influence the output of one another depending on which signal reaches the output first. A race condition may also occur any time an output is dependent on the sequence or timing of other events and the events may occur in different and/or unpredictable orders. The error 230 may occur between the clock falling edge 207 and the clock rising edge 205, and typically in the low state of the clock output 210. Further, the error 230 may occur at each clock falling edge 207 (assuming the clock falling edge aligns each time with a data falling edge).

In one example, the error 230 may take the form of an aberration in the clock output 210. The error 230 may cause an associated system to become synchronized and potentially cease transmitting data due to an error condition. In one embodiment, the error (as shown in the first case 201 of the output 210) in the clock output 210 may occur at the falling edge 207 of the clock output 210. In this embodiment, the microcontroller may drive the clock output to a high state at event 260, as depicted in the second case 202 of the clock output 210. By driving the clock to a high state, the error may be effectively covered or hidden from being detected by the sink device. The clock line may be driven high with the same or steeper slope as the rising edge of the error in the clock line. Further, since the microcontroller is driving the clock line, the clock pulse may be intentionally created and thus intended for detection by the sink device. Accordingly, the sink device may recognize this high state as an intended clock signal instead of an error. Because the clock signal may be intended, the data may be timed using this clock signal and may maintain synchronization between the clock and data lines.

Continuing this embodiment, the clock line may be driven high almost immediately after the falling edge 207 of the clock line to ensure synchronization between the clock and data lines. As depicted in case 202 of the output 210, because the clock line is driven high after the falling edge 207 of the clock line, the period of time the clock line is low (shown as time T1) may be shorter than a standard low clock pulse. This minimum of time T1 of the clock line low state may depend on the capability of the sink device (which may be a FET) for detecting a short pulse. For example, the sink device may be used to detect the falling edge and rising edge of the clock line. Further, the sink device may have a minimum transition time that it is capable of sensing. If the minimum time is less than the time T1, then a different type of FET may be employed or the time T1 may be increased. An example of determining the whether the sink device may be capable of detecting the time T1 follows. The sink device may be tested to determine if its minimum detectable time for a low signal is greater than the time T1. In this example, a pattern of twenty low signals and twenty high signals may be inputted into a register. The sink device may be used to detect the pattern of high and low signals. If the pattern detected by the sink device and the input pattern match, the sink device may pass and may successfully detect pulses separated by a predetermined time between the falling edge and the rising edge of the pulses. If the patterns do not match, the time between the falling edge and rising edge of the pulses may need to be increased or an alternative device capable of detecting shorter transition times may be used.

Figure 3:
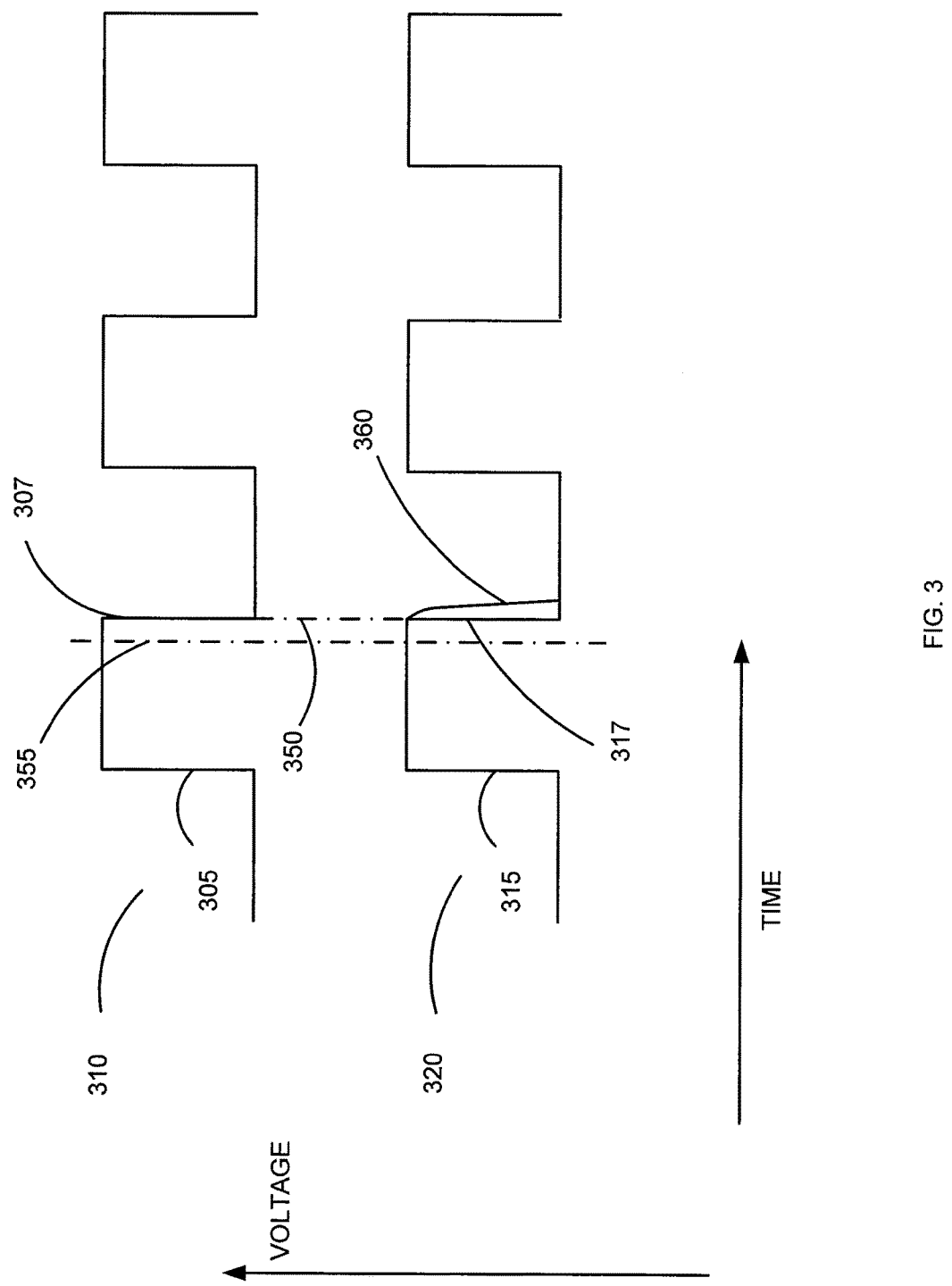
FIG. 3 is another timing diagram showing the output of a first and second digital line, including an effectively additional falling edge generated by maintaining saturation of at least one FET.

FIG. 3 is a timing diagram depicting the states of two outputs along a common timeline. FIG. 3 includes a first output 310 and a second output 320. The first output 310 may be the value of a clock line and the second output 320 may be the value of a data line. The data line may be driven by a sink device. Generally a sink device may receive data as opposed to being a source of data. Although FIG. 3 depicts only two outputs for explanatory purposes, alternative embodiments may employ additional outputs. Further, although many of the examples contained herein refer to the first output 310 as a clock output 310 and the second output 320 as a data output 320, these references are examples only and not limiting. Additionally, as depicted in FIG. 3, the secondary output 320 illustrates that the data line may be driven low by a sink device and may be driven low by a microcontroller (the microcontroller transition is depicted by a dotted line).

In FIG. 3, the clock output 310 may define a clock falling edge 307 and a clock rising edge 305. The data output 320 may define a data falling edge 317 and a data rising edge 315. Further, the low and high states indicate the two states between which the clock output 310 and data output 320 may switch. When the clock output 310 or the data output 320 is in a low state, the clock line or the data line may have a voltage of zero or equivalent to zero. When the clock output 310 or the data output 320 is in a high state, the voltage of the clock line or the data line may be Vcc or approximately Vcc. For example, the clock output 310 may be zero and at the clock rising edge 305, the clock output 310 may switch from zero to Vcc. Continuing the example, the clock output 310 may switch from Vcc to zero at the clock falling edge 307.

As previously discussed with respect to FIG. 2, an error (not shown in FIG. 3) in the clock output 310 may cause certain systems to sporadically desynchronize data and potentially cease transmitting data when it may be desirable to continue transmission. In one example, the error may occur during the transition from a high to low state on the data line as driven by the sink device. Thus, it may be desirable to prevent the event that causes the error in the clock output 310. In another example, the $I^2C$ protocol may be employed to allow communication between devices. Thus, the default state of the data line may be high. Additionally, in order to prevent the event that causes the error in the clock line of the $I^2C$ protocol, the data line may be transitioned when the clock line is low.

The states of the data and clock lines may also be described as "asserted" and "de-asserted" depending on the protocols and implementations of an embodiment. For example, an asserted state may be a high signal value in certain protocols or, electronic communications systems and a low value in others. The states of the data and clock lines have been described herein with respect to the $I^2C$ protocol as an example of a larger implementation applicable to multiple system architectures. In electronic communications systems employing other protocols, the clock and data lines may be asserted and de-asserted in the manner described herein without departing from the spirit or scope of the invention.

In one embodiment, the data output 320 may be driven low by the microcontroller after the clock output 310 switches to zero. Stated differently, the data output 320 and the clock output 310 may be switched such that the FETs stay in saturation. In this embodiment, the FETs may be electrically coupled. Furthermore, by altering the electrical characteristics of the FETs (e.g., assisting the FETs to maintain saturation), the error in the clock line may be prevented because the data line may remain in a high state. In many systems similar to the one under discussion, a software command may initiate state changes to either the clock line or data line. Such software commands generally take a certain time to be executed by the hardware responsible for changing the state of the clock and/or data line and thus the outputs 310, 320. Typically, the delay between initiation of the software command and the actual state change of the associated output is identical for both the clock output 310 and data output 320. Thus, if both the clock line and data line are instructed, via software and hardware, to change from a high state to a low state simultaneously, the state changes likewise occur simultaneously and may trigger the error 230 discussed above with respect to FIG. 2.

In order to avoid such a situation, the present embodiment may employ a software command to change one output 310 from a high state to a low state and a hardware element to delay the transition of the other output 320 from a high state to a low state. For example, a software command may initiate a clock falling edge 307. The same software command may instruct a counter (not shown) to begin a countdown. Generally, the software command is issued at an initiation time 355. The initiation time 355 precedes the time at which the clock falling edge 307 occurs (the "falling time" 350). The delay between the initiation time 355 and falling time 350 is the time taken to execute the software command by the hardware responsible for changing the state of the clock line 310. In one embodiment, this is approximately one microsecond.

Still with respect to FIG. 3, the initiation time 355 also represents the time at which a counter associated with the data line 320 begins its countdown. The counter may, for example, begin at four and count down to zero. Such an exemplary counter may take approximately 300 nanoseconds to change from one number to the other, thereby taking approximately 1200 nanoseconds to complete its count. Alternative embodiments may employ a counter having a different starting number, ending number, time to change numbers, and so forth. Further, alternative embodiments may employ counters that count up instead of down.

When the counter reaches zero, the FET associated with the data line 320 may be opened by the microcontroller, thereby mitigating the cause of the error on the clock line. Since the counter is embodied in hardware, the state of the data line may be changed substantially instantaneously. That is, the data line's state may change without incurring the delay occurring after initiation of a software command to change state, as described above. Because the change is substantially instantaneous, the data line shifts from high to low approximately 1200 nanoseconds after the counter began its operation.

Thus, it can be appreciated that the FET may be kept open until a completion time 360 that occurs approximately 300 nanoseconds after the falling time 350. By employing the counter in the described fashion, the embodiment may assist the FETs maintain saturation, thus preventing the bounce in the clock line and thereby generating a error 230.

In the present embodiment, when the data line is high, the counter may be started prior to every clock falling edge 307 of the clock output 310. Alternately, the counter also may be started prior to the clock falling edge 307 only when the embodiment determines that the clock falling edge 307 of the clock output 310 and the data falling edge 317 of the data line 320 will otherwise align. Moreover, the counter may be started prior to the clock falling edge 307 intermittently at predetermined events such as a prediction of a error occurring in the clock output 310.

It should also be noted that certain embodiments may require the clock output 310 and data output 320 to switch within a minimum time of each other. For example, the maximum delay in certain embodiments between the clock falling edge 307 and data falling edge 317 may be 300 nanoseconds. It should be appreciated that the clock intervals and number of intervals may be chosen to accommodate such restrictions.

Figure 4:
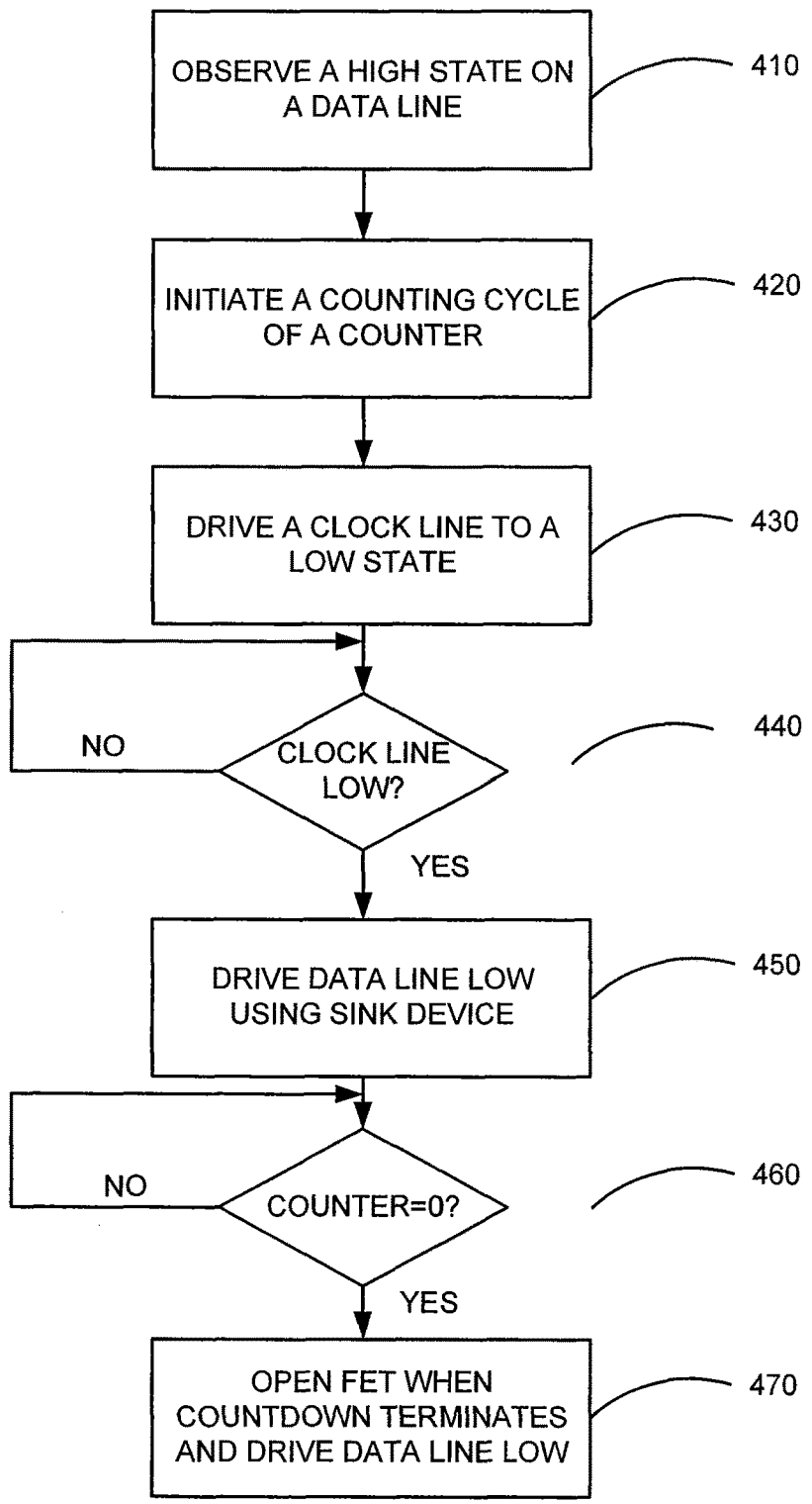
FIG. 4 is a flowchart depicting operations of an embodiment for maintaining saturation of the at least one FET.

FIG. 4 is a flow chart 400 generally describing the operation of the present embodiment. The flow chart 400 begins with operation 410, in which a data line may have a high state. Additionally, the data line may be driven by a sink device such as the data FET 150B of FIG. 1. When the data line is in a low state, the FETs are in saturation and thus the data FET 150B may not need to be kept open in order to prevent an error in the clock line. In the operation of block 420, the embodiment initiates a countdown of a counter at a predetermined event. In certain embodiments, the predetermined event is based on a clock output. The predetermined event that begins the countdown may be, for example, an instruction issued by software to change the state of the clock line and thus change the clock output. Further, as shown in the operation of block 430, the exemplary software instruction may be to switch the clock output from a high state to a low state. In the decision block 440, the sink device may detect the clock line dropping low. Further, the sink device may monitor the clock line, thus may detect the low signal of the clock line. Then in the operation of block 450, the sink device may drive the data line low.

In the decision block 460, the embodiment may monitor the counter until the counter reaches zero and may also monitor the value of a second output while the countdown continues. In one embodiment, the value of the second output may be a high state and the high state of the second output may not switch while the countdown executes. Additionally, the second output may be a data output. In the operation of block 470, the embodiment opens the data FET upon completion of the counting cycle. When the countdown completes, the data FET may be opened to assist the FETs in maintaining saturation. As stated above, the second output may be a data line. The counter may be directly or operationally connected to the data output such that the FET is opened and then drives the data line low at approximately the point the counter completes its counting cycle, which may be 300 nanoseconds after the sink devices drives the data line low.

Returning briefly to FIG. 2, the error 230 in the clock output 210 may cause a system to sporadically or completely prevent any further data transfer when it may be desirable to continue transferring data. Thus, it may be desirable to prevent the event that causes the error 230 in the clock output 210.

Figure 5:
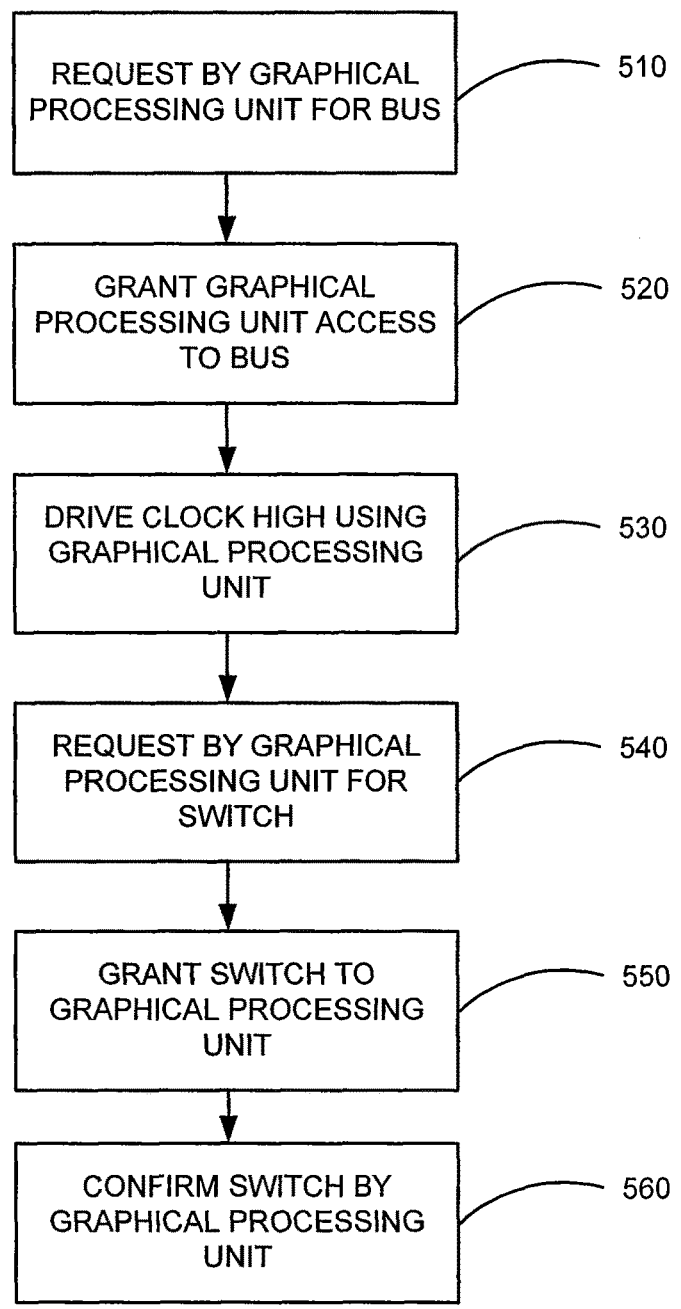
FIG. 5 is a flowchart depicting operations of an embodiment for negotiating control of a bus and a switch.

FIG. 5 is a flow chart 500 detailing an operating procedure for the present embodiment. The flow chart 500 begins in block 510, where the microcontroller receives a bus request from the GPU. The GPU may request the bus from the microcontroller by writing a one to a first bit of a software register in the microcontroller. When the microcontroller acknowledges the first bit of the software register is a one, it acknowledges the one in the first bit as a request and finishes any current transactions before granting the bus request to the GPU. In the operation of block 510, the GPU clock line may be low and the switch setting may be unknown. Next, in the operation of block 520, the microcontroller may grant the bus request to the GPU. By writing a one to the second bit of the software register, the microcontroller acknowledges the grant of the bus request. The GPU clock line may be low and the switch may now be owned by the microcontroller.

In the operation of block 530, the GPU may drive the clock output into a high state. The clock output may already be high (as the clock output may be connected to Vcc, thus making the clock output high by default), or may not be in a high state before the operation of block 530. In this operation, the switch is typically owned by the microcontroller. Next, in the operation of block 540, the third bit may be set to one. When the GPU requests the switch from the microcontroller, the GPU clock line may still be high and the switch is still owned by the microcontroller. In the operation of block 550, the microcontroller may grant the switch and set the fourth bit to one to acknowledge the grant. The GPU clock line may be high and the GPU may own the switch. Then in the operation of block 560, the GPU may confirm ownership of the switch.

Although the present invention has been described with respect to particular apparatuses, configurations, components, and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:

1. A system, comprising:
a graphical processing unit (GPU); and
a microcontroller coupled to the GPU through a bus that includes a clock line, wherein the microcontroller is configured to:
receive a bus request from the GPU;
grant the bus request to the GPU;
receive a request for a switch from the GPU;
grant the request for the switch to the GPU;
wherein the GPU is configured to drive the clock line to a high state, in response to receiving access to the bus includes a clock line.

2. The system of claim 1, wherein the microcontroller includes a register.

3. The system of claim 2, wherein when the microcontroller receives a bus request from the GPU, the GPU writes a value into a first bit of the register.

4. The system of claim 3, wherein when the microcontroller grants the bus request to the GPU, the microcontroller writes a value into a second bit of the register.

5. The system of claim 1, wherein when the microcontroller grants the bus request to the GPU, the microcontroller completes any current transactions on the bus.

6. A system, comprising:
a display device;
a graphical processing unit (GPU);
a switch coupled between the display device and the GPU, through a bus that includes a clock line; and
a microcontroller coupled to the display device through the bus, wherein
the microcontroller is configured to:
send data through the bus to the display device;
receive a request from the GPU for access to the bus;
complete pending transactions on the bus; and
closing the switch responsive to completing the pending transactions;
wherein the GPU is configured to drive the clock line to a high state, in response to receiving access to the bus.

7. The system of claim 6, wherein the bus comprises a clock line and a data line.

8. The system of claim 7, wherein the microcontroller is further configured to sample the data line.

9. The system of claim 6, wherein when the microcontroller sends data through the bus, the microcontroller activates one or more field-effect transistors (FETs) coupled to the bus.

10. The system of claim 6, wherein the switch comprises one or more field-effect transistors (FETs).

11. A system, comprising:
receiving, by a microcontroller, a bus request from a graphical processing unit (GPU) coupled to the microcontroller via a bus that includes a clock line;
granting, by the microcontroller, a bus request to the GPU;
driving the clock line to a high state by the GPU, in response to receiving access to the bus from the microcontroller;
receiving, by the microcontroller, a request for a switch from the GPU; and
granting, by the microcontroller, the request for the switch to the GPU.

12. The method of claim 11, wherein the microcontroller includes a register, and wherein receiving the bus request from the GPU includes writing a first value into a first bit of the register.

13. The method of claim 12, wherein granting, by the microcontroller, the bus request to the GPU includes the microcontroller writing a second value into a second bit of the register.

14. The method of claim 11, wherein granting, by the microcontroller, the bus request to the GPU includes completing at least one current transactions on the bus.

* * * * *